(12) United States Patent
Mermod et al.

(10) Patent No.: US 8,224,910 B2
(45) Date of Patent: Jul. 17, 2012

(54) METHOD OF MANAGING A COLLABORATIVE PROCESS BY MEANS OF ELECTRONIC MESSAGES

(75) Inventors: Alexandre Mermod, Marseilles (FR); Sebastien Bassompierre, Marseilles (FR)

(73) Assignee: Calinda Software, Marseilles Cedex (FR)

( * ) Notice: Subject to any disclaimer, the term of this patent is extended or adjusted under 35 U.S.C. 154(b) by 382 days.

(21) Appl. No.: 12/650,964

(22) Filed: Dec. 31, 2009

(65) Prior Publication Data

US 2010/0169447 A1    Jul. 1, 2010

Related U.S. Application Data

(63) Continuation-in-part of application No. PCT/IB2008/001747, filed on Jul. 1, 2008.

(30) Foreign Application Priority Data

Jul. 3, 2007 (FR) .................................... 07 04793

(51) Int. Cl.
    *G06F 15/16* (2006.01)
(52) U.S. Cl. ......... 709/206; 709/204; 709/205; 370/260
(58) Field of Classification Search .................. 709/204, 709/205, 206; 370/352
See application file for complete search history.

(56) References Cited

U.S. PATENT DOCUMENTS

2005/0234850 A1   10/2005   Buchheit et al.
2007/0038777 A1    2/2007   Low et al.

FOREIGN PATENT DOCUMENTS

| FR | 2863426 A1 | 6/2005 |
|---|---|---|
| WO | 0241160 A1 | 5/2002 |
| WO | 02041160 A1 | 5/2002 |

OTHER PUBLICATIONS

Crocker, "Standard for the Format of ARPA Internet Text Messages," RFC822, Aug. 13, 1982, 41 pages.
Berners-Lee et al., "Uniform Resource Locators (URL)," RFC1738, Dec. 1994, 25 pages.
Freed et al., "Mutipurpose Internet Mail Extensions (MIME) Part One: Format of Internet Message Bodies," RFC2045, Nov. 1996, 25 pages.
Freed et al., "Mutipurpose Internet Mail Extensions (MIME) Part Two: Media Types," RFC2046, Nov. 1996, 45 pages.
Moore, "MIME (Multipurpose Internet Mail Extensions) Part Three: Message Header Extensions for Non-ASCII Text," RFC2047, Nov. 1996, 12 pages.

(Continued)

*Primary Examiner* — Wing Chan
*Assistant Examiner* — Tesfay Yohannes
(74) *Attorney, Agent, or Firm* — Seed IP Law Group PLLC

(57) ABSTRACT

A method of managing a collaborative process using a computing system. The method includes: receiving a first message from a first user, generating a second message, inserting into the second message an information taken from the first message and at least one selection link of a response choice to the message in relation with all or some of the information taken from the first message, and inserting into the link a response address and at least one first identifier to identify a response choice corresponding to the link and to the information taken, the link being configured to generate a response message containing the first identifier when it is selected by a user that has received the message.

19 Claims, 14 Drawing Sheets

OTHER PUBLICATIONS

Palme et al., "MIME E-mail Encapsulation of Aggregate Documents, such as HTML (MHTML)," RFC2110, Mar. 1997, 15 pages.

Levinson, "Content-ID and Message-ID Uniform Resource Locators," RFC2111, Mar. 1997, 4 pages.

Hoffman et al., "The Mailto URL Scheme," RFC2368, Jul. 1998, 10 pages.

Gellens, "The Text/Plain Format Parameter," RFC2646, Aug. 1999, 15 pages.

Day et al., "Instant Messaging/Presence Protocol Requirements," RFC2779, Feb. 2000, 21 pages.

Connolly et al., "The 'Text/HTML' Media Type," RFC2854, Jun. 2000, 7 pages.

Saint-Andre, "Extensible Messaging and Presence Protocol (XMPP): Instant Messaging and Presence," RFC3921, Oct. 2004, 84 pages.

Weiler et al., "Minimally Covering NSEC Records and DNSSEC On-line Signing," RFC4470, Apr. 2006, 7 pages.

```
Subject: Your opinion on:"Project X Status"
From: server@server.com
To: user2@user2.com
```

Topic: R&D
Project X Status, subject sent by User1

Menu:
-Visualize the discussion online
-Help

Give your opinion

Discussion concerning the progress made for Project X

What has been accomplished since the last status meeting?

Confirm – Disconfirm
Respond – Propose

What is the plan for the next period?

Confirm – Disconfirm
Respond – Propose

What are the obstacles and the ideas to be discussed in further detail?

Confirm – Disconfirm
Respond – Propose

FIG. 3A

From: user2@user2.com
To: server@server.com
Subject:

Agreement=100%
<-Give your email a subject, it will constitute the title of the contribution->
<-Place your message here->

<Do not erase the following>
BEGINMzdBB6MKiTVqO2PvzSmmswvHa9yzhRj5cmByuaVAs69iaFT7ZZJeSz10gC2/uc+hAx+12j3571M-END

FIG. 3B

From: user2@user2.com
To: server@server.com
Subject: Financial risk for Z

Agreement=100%
<-Give your email a subject, it will constitute the title of the contribution->
<-Place your message here->
A potential financial risk exists for phase Z of the project due to incertitude of change and fluctuations in the prices of the raw materials concerned.

<Do not erase the following>
BEGINMzdBB6MKITVqO2PvzSmmswvHa9yzhRj5cmByuaVAs69iaFT7ZZJeSz10gC2/uc+hAx+12j3571M-END

Subject: Financial Risk for Z
From: server@server.com
To: user1@user1.com

Topic: R&D
Financial risk for Z, subject sent by User2

Menu:
-Visualize the discussion online
-Help

Give your opinion
User2 reacted to:
Status of the project X, subject sent by User1
What are the obstacles and the ideas to be discussed in further detail?
By proposing: Financial risk for Z
A potential financial risk exists for phase Z of the project due to incertitude of change and fluctuations in the prices of the raw materials concerned.     Confirm - Disconfirm
                                                                                                    Respond - Propose
Formulate your agreement level for this new subject:
In disagreement - Mostly in disagreement - Mostly in agreement - In agreement

FIG. 3D

| From: | user1@user1.com |
|---|---|
| To: | server@server.com |
| Subject: | Financial risk for Z |

Agreement=66%
<-Send this message directly->

<Do not erase the following>
BEGIN-NXImEdy+PDC57SE5KgwFsGB3rhqCtjXNAYPW9GjvAtBHFeu/afnprA===-END-

*FIG. 3E*

| From: | user2@user2.com |
|---|---|
| To: | server@server.com |
| Subject: | <Do not erase the following> BEGIN-idpPlz6f1646rgdS-END |

Agreement=100%
<-Give below a subject for your message, it will constitute the title of the contribution->

<-Place your message here->

<Do not erase the following>
BEGIN-Mtzd6MjlTVqO2PvzSmmyjHa9yjyzhRyejcmByuaVAs6526kjyjfZZJeSz10gqc551a54q-END

*FIG. 6*

METHOD OF MANAGING A COLLABORATIVE PROCESS BY MEANS OF ELECTRONIC MESSAGES

BACKGROUND

1. Technical Field

The present disclosure relates to a method of managing a collaborative process.

2. Description of the Related Art

Collaborative process management software are currently used in industry and are generally called "Computer Supported Cooperative Work" CSCW. In particular are known work group software or "groupware", management software of Internet discussion forums, management software of Website contents or "wiki" (Webpages that can be modified by authorized visitors), software for collaborative writing of documents, as well as "workflow" software allowing for teamwork organization for a project.

Certain software are provided to manage a collaborative process through a specific messaging infrastructure (Microsoft Exchange, Lotus Notes, etc.) that requires the users to use a specific messaging software. Other software are exclusively dedicated to message diffusion (mailing list managers Majordomo, Listserv, Yahoo! etc.) and are not designed to manage no matter what type of collaborative process.

United States Patent Publication 2007/0038777 describes a management process of a conversation by the intermediary of electronic messages. The server executing this method, called "conversation server", retransmits to all the conversation participants the messages emitted by the other participants, such that a participant that wants to send a message to the other participants does not need to manage a list of recipients. To this end, the server attributes a correspondence address specific to each conversation (email address), that is then used by the conversation participants. This conversation address also allows the server to determine to which conversation a received message belongs. For each conversation, the server also manages a list of participants, the identities of which are determined by their messaging addresses, and manages the arrival of new participants into the conversation by sending out notifications.

BRIEF SUMMARY

In an embodiment, a method of managing a collaborative process comprises the sending of electronic messages to member users of the collaborative process and the reception of response messages emitted by users. Such a method may be implemented in the form of a software executed by a computer.

The present disclosure relates to a method of managing a collaborative process based upon a similar principal of electronic message diffusion but which also allows for the management of collaborative process states. A method such as that described by US 2007/0038777 does not manage the collaborative process states and merely displays the contents of messages exchanges so that the conversation members may have a general overview of the conversation. In an embodiment, the process state management provides for not only the storing of the message contents (questions, opinions, propositions . . . ) emitted by the process members, and responses to these messages, but also the detection and the storing of the existing relations between the diverse messages.

In an embodiment, such a management also controls the contents of each message. To this end, specific software (Microsoft Exchange, Lotus Note) is used that ensures the message configurations and the analysis of the choices selected by the users (for example setting a meeting with Microsoft Exchange, offering the user the possibility of choosing, as a response, between the options "available" or "not available" presented to him). Nevertheless, as indicated above, the detection of the choices made by the users requires a specific software installed upon each work station (for example Microsoft Outlook). This software detects the users' choices and sends a corresponding information to a central management center (for example the core of Microsoft Exchange).

In an embodiment, a method of managing a collaborative process may be implemented without requiring that the users use a specific software. In an embodiment, a conventional messaging software in conformance with industry standards allows people to participate in a collaborative process.

In addition, it may be desired to ensure that the person who responds to a message emitted in the framework of a collaborative process, is actually the person who was initially addressed. Indeed, it is imaginable that the addressee of a message transmits the message to another person who, even though he is a member of the process, is not the initial addressee of the message. To this end, a simple verification of the messaging address of the person emitting the response is not sufficient: this person may be a member of the process yet not the person to whom the initial message was sent.

In an embodiment, a method of conversing by electronic messaging to manage collaborative processes includes an analysis of the contents of messages emitted by the process members.

In an embodiment, messages sent by other process members are transmitted to users of a collaborative process by inserting therein "response choice links" that are response message generators. Such links are representative of response choices proposed by the system to the process members. An organized collaborative process is thus generated, comprising "contributions" emitted by the users and responses to these contributions, these responses themselves forming new contributions organized according to predetermined response choices materialized by the links inserted into the contributions at the moment when they are transmitted to the users. These response links are of the standard type and are compatible with most messaging software, each link representing a possible response to the transferred message. It is for example a link of the type "mailto:", executable by most computers provided with a messaging software.

An embodiment includes configuring the response links by incorporating therein a response choice identifier that may comprise information about the nature or the type of the response, information about the context of the message within the collaborative process, so that the messages generated by the links may be analyzed and interpreted by a collaborative process server.

In an embodiment, a method of managing a collaborative process by means of a computing system, comprises the sending of electronic messages to user members of the collaborative process and the reception of response messages emitted by the users, characterized in that it comprises the steps of: receiving a first message from a first user; generating a second message; inserting in the second message an information taken from the first message; inserting in the second message, in relation with all or some of the information taken from the first message, at least one selection link of a response choice to the message; inserting in the link a response address and at least a first identifier to identify a response choice corresponding to the link and to the information taken; and sending the second message to at least a second user, the link being configured to directly generate a response message containing the first identifier when it is selected by a user that has received the message.

According to one embodiment, the method comprises the step of inserting into the link a second identifier provided to identify the second user as an addressee of the second message, the link being configured to directly generate a response message containing the first and the second identifiers when it is selected by the second user.

According to one embodiment, the method comprises a step of configuring the link such that the first and the second identifiers are placed in one of the following parts of the response message that can be generated by the link: a subject field of the message; a body of the message; a header field of the message.

According to one embodiment, the method comprises a step of encrypting at least the second identifier before inserting it in the link.

According to one embodiment, the method comprises a step of forming the first identifier that comprises a step of including, in the first identifier, an identifier provided to identify a state of the collaborative process within which the generation of the second message is written.

According to one embodiment, the step of forming the first identifier also comprises a step of including, in the first identifier, an identifier provided to characterize a type or a nature of the response choice corresponding to the link.

According to one embodiment, the method comprises a step of also inserting into the link an indicator provided to indicate a level of agreement or of approval relative to the information taken from the first message.

According to one embodiment, the method comprises a step of also inserting into the link a language identifier of the collaborative process in which the generation of the second message is written.

According to one embodiment, the method comprises a step of storing, in a correspondence table, a relation between the first identifier and a state of the collaborative process in the context of which the second message is generated.

According to one embodiment, the method comprises a step of storing in a correspondence table a relation between the first identifier and the identity of the addressee of the second message.

According to one embodiment, the method comprises the steps of: receiving a response message generated by the link; extracting the first identifier of the response message; extracting from the response message a new information written by the user that sent the response message; attributing to the new extracted information one or more identifiers and storing the new information and the one or more identifiers associated with the information.

According to one embodiment, the method comprises the steps of: receiving a response message generated by the link; extracting from the response message a new information written by the user that sent the response message; searching for a separator symbol within the new information; dividing the new information into several aspects, thanks to the separator symbol; attributing an identifier to each aspect; and storing the aspects as well as the identifier associated with each aspect.

According to one embodiment, the method comprises the steps of: generating a third message; inserting into the third message the aspects of the information taken from the response message; inserting into the third message, for each aspect of the new information, at least one selection link of a response choice to the message; inserting into each link a response address and at least the identifier of the aspect corresponding to the link; and sending the third message to at least a user of the collaborative process.

According to one embodiment, the method comprises the steps of: receiving a response message generated by the link; extracting the second identifier from the response message; identifying the addressee of the initial message thanks to the second identifier; verifying that there is a concordance between the emitting address of the response message and the addressee of the initial message, and, if not, beginning an action leading to the acceptance or the rejection of the emitting address of the response message as a member of the collaborative process.

According to one embodiment, the collaborative process is a conversation or a vote, comprising a step of inserting, in messages sent to users, several generating links of response messages allowing the users to express points of view or responses to questions.

According to one embodiment, the method comprises the steps of: inserting into messages sent to users links allowing the users to express a level of agreement to points of view expressed by other users without themselves expressing a point of view; and inserting into each link a parameter representative of a level of agreement.

According to one embodiment, the method comprises the steps of receiving the first message by means of a messaging software, selecting the link so that the messaging software directly generates a response message containing the first identifier, and sending the message.

Embodiments of the disclosure also relate to a computing system for management of a collaborative process, characterized in that it is configured to implement embodiments of the methods described above, and in that it comprises a message manager configured to generate and to send, to member users of the collaborative process, electronic messages containing generation links of response messages including at least the first identifier.

According to one embodiment, the computing system is also configured to receive an electronic message containing an attachment, save the attachment, send to member users of the collaborative process a message containing a link pointing to the saved attachment.

Embodiments of the disclosure also relate to embodiments of a system described above, wherein the Message Manager is configured to insert, into messages, message generation links compatible with an electronic messaging infrastructure based upon electronic messaging, instant messaging, or mobile telephone messaging standards.

BRIEF DESCRIPTION OF THE SEVERAL VIEWS OF THE DRAWINGS

Implementation examples of embodiments of the method of managing a collaborative process will be described in the following, in a non-limiting manner, in relation with the following figures among which:

FIGS. 3A to 3E represent electronic messages generated in a conversation type collaborative process framework, implemented in conformance with the method according to an embodiment, FIG. 6 shows a message generated according to an alternative implementation of the method according to an embodiment.

DETAILED DESCRIPTION

In the following description, numerous specific details are given to provide a thorough understanding of the embodiments. The embodiments can be practiced without one or more of the specific details, or with other methods, components, materials, etc. In other instances, well-known structures, materials, or operations are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" "according to an embodiment" or "in an embodiment" and similar phrases in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

Figure 1:
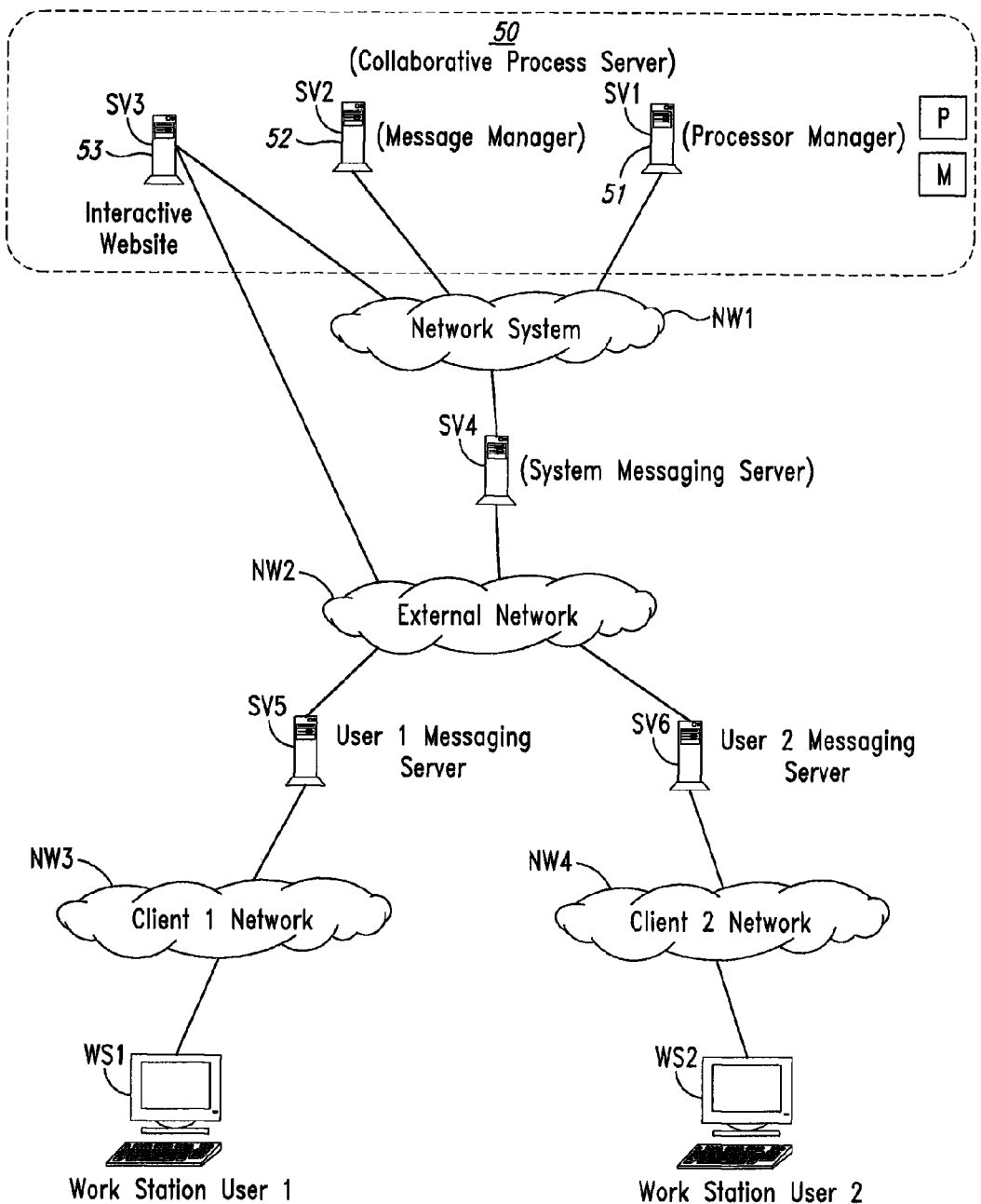
FIG. 1 schematically shows an example of a computing system within which the method according to embodiments may be implemented.

FIG. 1 shows an embodiment of a computing system within which the method according to an embodiment may be implemented. The system comprises a collaborative process server 50 executing the method according to an embodiment, and users, here two users shown in the form of work stations WS1, WS2. The server 50 comprises two elements that cooperate to manage the collaborative process, here a Collaborative Process Manager 51 and a Message Manager 52. Each element 51, 52 may be realized in the form of software executed by a computer or a processor. The Process Manager 51 is here executed by a first server SV1 and the Message Manager is here executed by a second server SV2. The two elements 51, 52 may however be executed by the same server depending upon the desired processing power (which may be a function of the number of users likely to participate at the same time in a collaborative process). A server may be implemented with one or more processors P executing instructions stored in one or more memories M.

The server 50 and the users WS1, WS2 are linked in a conventional manner by the intermediary of an external network NW2 (for example the Internet network) and can exchange electronic messages. To this end, the servers SV1, SV2 are for example linked to a messaging server SV4 by the intermediary of a network system NW1. The user WS1 is for example linked to a messaging server SV5 by the intermediary of a network NW3, and the user WS2 is for example linked to a messaging server SV6 par by the intermediary of a network NW4. The messaging servers SV4, SV5, SV6 are linked to the external network NW2. These various servers may function, for example, according to any type of known platform, notably Windows®, Linux®, Unix®, etc.

Optionally, the server 50 can include an interactive website 53 to which the users can connect to see a graphic representation of a collaborative process or to generate new processes, manage the subscriptions, admit new users, etc. The website 53 is here hosted by a server SV3 that is linked to the external network NW2 and may optionally be linked to the servers SV1, SV2 by the intermediary of the network system NW1.

In an embodiment, the state management of a collaborative process by means of a computing system such as that shown in FIG. 1 supposes that context parameters (or contextual parameters) are defined, allowing the process states to be characterized from a conceptual model of the process. A functional model of the collaborative process is also used to define the functional aspects of the process, that is to say, to define how the information is exchanged between the process members and how they are identified, by their nature or by their type. A codification model of the conceptual model and of the functional model is also employed, that is a set of codes or of identifiers allowing some or all of the elements of the conceptual model and of the functional model to be referenced.

The implementation examples of the method described in the following are linked to specific conceptual, functional, and codification models of the collaborative process. In order to better understand these examples, first will be described, in a non-limiting manner, the conceptual, functional, and codification models upon which these examples are based.

Conceptual Model Example

The following conceptual model comprises a certain number of definitions:
- a "contribution" is an information (for example a question posed, an opinion about a topic, a proposition, a response to a question, etc.) emitted by a user member of a collaborative process, for example an initiating contribution or a contribution in response to a previous contribution emitted by another user, the contribution itself being susceptible to responses from the other users;
- the collaborative process thus comprises a sequence of contributions, forming a sort of tree, and is started by a first contribution or by an initiating contribution of the process;
- a contribution comprises one or more "aspects"; indeed a user may wish to respond to a contribution by raising several points, each susceptible to responses from the other users, each point forming an aspect of the contribution;
- a response to a contribution may comprise the expression of an agreement level;
- a response to a contribution may also comprise only the expression of an agreement level without having an aspect; in this case it is not considered to be a contribution but the agreement level expressed may be stored as a process parameter;
- a response to a contribution can therefore comprise one or more aspects and an agreement level, it thus itself forms a new contribution, or only comprises an agreement level;
- the term "inquiry" can be used to designate the fact that a contribution emitted by a process member is transmitted to another process member, thus inviting him to respond to the inquiry and to emit a new contribution.

Functional Model Example

From the conceptual model above, defined here is a functional model adapted to the management of a collaborative process of the "collective intelligence" type and is developed by the intermediary of electronic messages:

the server 50 transfers to the users, in the form of electronic messages, the contributions emitted by the other users, each electronic message transmitted thus forming an inquiry message;

a user can respond to an inquiry message by sending to the server 50 a response message comprising one or more aspects and forming a contribution, by choosing a response option from among several options proposed to him. Here, as an example, it is chosen to propose to the user four response options: "confirm" (approve), "disconfirm" (disapprove), "respond", "propose";

optionally, a user may respond to an inquiry message by choosing one of the above mentioned options all while expressing an agreement level that is for example materialized by a percentage comprised between 0 and 100%;

in order to facilitate the server 50 to distinguish the various aspects of a contribution, it may be requested that the users use, in their response messages, a predetermined separator symbol to separate the aspects of the contribution, for example a paragraph jump (blank line), or any other separator symbol that may be provided;

if a contribution comprises several aspects that are sent back to a user in an inquiry message, a user can respond to each aspect present in the inquiry message by choosing one of the previously cited options ("confirm", "disconfirm", "respond", "propose") and, optionally, all while expressing an agreement level between 0 and 100%;

a user can equally respond to an inquiry message by sending to the server 50 a message not comprising any aspects (i.e., comprising no opinion, response, proposition, etc.) and only comprising an agreement level, by choosing one of the following possibilities: "in disagreement", "mostly in disagreement", "mostly in agreement", "in agreement". In this case, pre-defined levels of agreement, for example 0%, 33%, 66% and 100%, may be respectively associated to one of these choices. The response message only comprising an agreement level is not considered as a contribution, in conformance with the conceptual model.

Codification Model Example

From the functional model above, the states of the collaborative process may be managed by means of context parameters. As an example, the following identifiers may be defined as context parameters:

an identifier UID ("user identifier") forming a number attributed to a user;

an identifier CID ("contribution identifier") forming a number attributed to a contribution (that is a number of a message received by the server if this message contains one or more aspects and thus forms a contribution);

an identifier AID ("aspect identifier") forming an aspect number attributed to each aspect present within a contribution (each aspect able to be distinguished, for example, thanks to the separator symbol);

possibly a language identifier LG indicating the language in which the one or more aspects of a contribution are formulated;

It will be noted that the identifier UID is, in the following, a code associated to, and different from, the user's messaging address. Nevertheless, the user's messaging address may also be used as the identifier UID, the only limitation of this embodiment being that several users having the same messaging address is not allowed.

Besides the contextual parameters, action parameters may be defined to characterize the type or the nature of a choice made by a user. For example, the four following parameters may be defined:

an identifier "TYPE" defining the type of response to an inquiry message, this identifier being equal to 0 when the user emits a response message containing one or more aspects (contributions), and equal to 1 when the user sends a response message merely expressing an agreement level;

an identifier "CNATURE" defining the nature of a contribution, this identifier being equal to 0 for a response of the type "confirmation" (approval), to 1 for a response of the type "disconfirmation" (disapproval), to 2 for a response of the type "response", and to 3 for a response of the type "proposition";

Other identifiers and other functional models can evidently be defined according to the type of collaborative process to be managed, for example an identifier "DISPO" indicating an availability if it is equal to 1 or an unavailability if it is equal to 0 in response to a meeting request for a specific date.

In addition, the identifiers TYPE and CNATURE are themselves susceptible of numerous variations within the functional model. Indeed, nothing requires that the skilled person choose four possible values to qualify the nature of a contribution, the choices performed being simply the result of efforts to optimize the model for certain applications.

General Functioning of the System of an Embodiment

Figure 2:
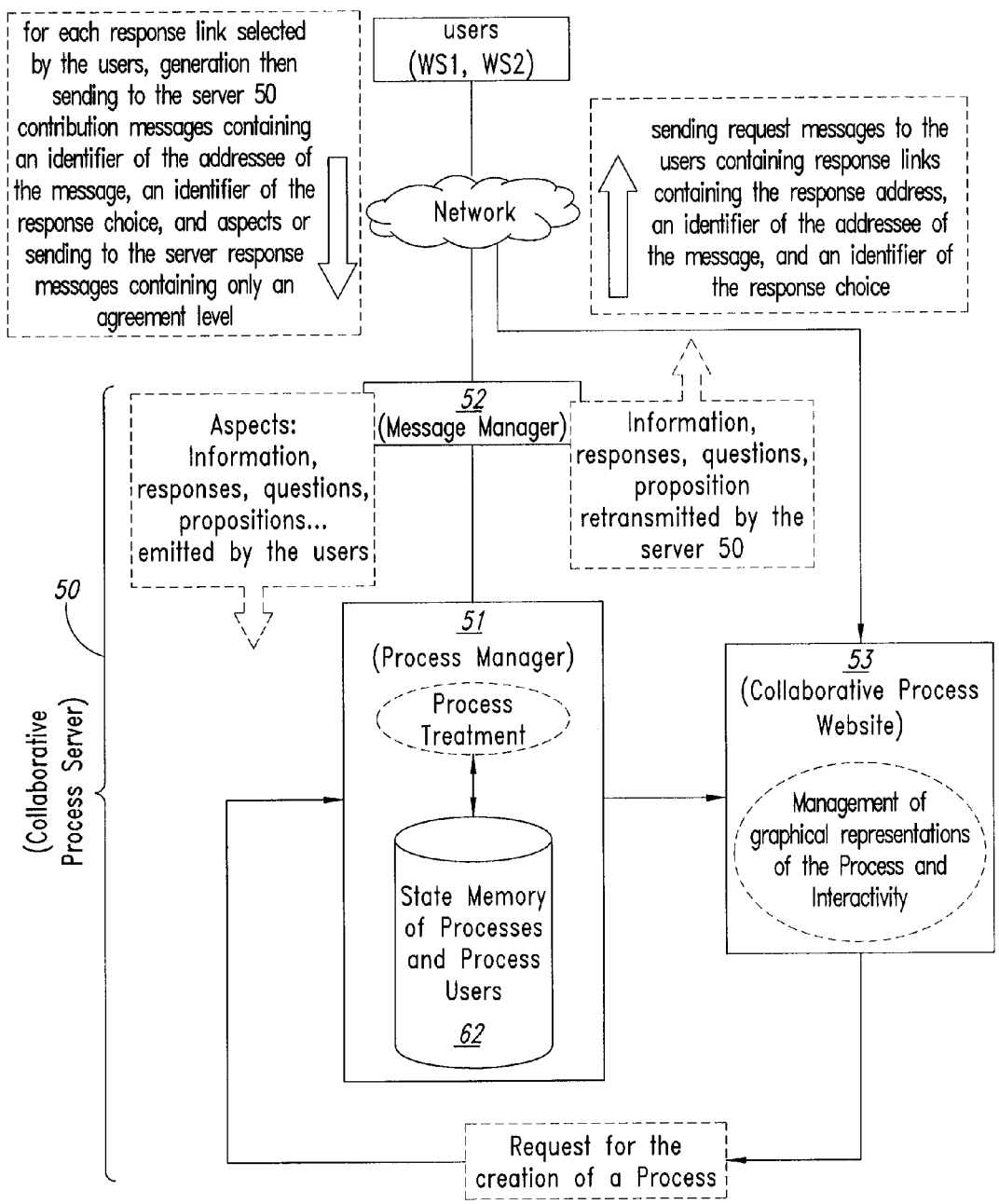
FIG. 2 shows the general functioning of the computing system of an embodiment.

FIG. 2 is a functional diagram of the computing system of FIG. 1, showing its general functioning in relation with the functional and conceptual models described above.

The Process Manager 51 ensures the treatment of collaborative processes and comprises a memory 62 configured to store process states and process users. The process states memory 62 is structured in the form of a database. Each process managed by the Process Manager comprises a succession of states and of transitions causing these states to evolve towards an outcome desired by a group of users, members of the process. The process states memory is a mass storage of the server SV1, comprising for example one or more hard drives, in which are stored the context parameters and the action parameters.

A user (subscribed or not, according to the chosen commercial operating mode) can begin a collaborative process by connecting to the website 53 and by designating the process members by their respective messaging addresses (these members being themselves subscribed or not according to the chosen commercial mode) and by indicating a topic and the issues to be treated forming the aspects of the first process contribution (initiating contribution of the process).

Other modes of process initialization can be provided, notably the sending to the server 50 of a message containing, in its body, a first field containing aspects of the first contribution and a second field containing a list of the process members, the server configured to interpret such a process initialization message.

An identifier UID is associated by the server 50 to each designated user and a member list of the collaborative process is thus defined at the beginning of the process. As the process evolves, this list can be enriched, little by little, with new users in a manner that will be described later.

The initiator user can for example decide to begin a collaborative process attached to a topic "R&D", entitled "Discussion concerning the progress made for project X", and comprising the three following aspects:

"What has been accomplished since the last progress meeting?";

"What is the plan for the next period?";

"What are the obstacles and the ideas to be discussed further?".

This information is communicated to the server via the website (a form to be filled out can be provided to this effect) or by an electronic message, according to the chosen initialization mode.

It will be supposed in the following that the electronic messages used to manage the collaborative process are "emails" but it will be specified later that embodiments are not exclusively dedicated to a messaging system by email.

When the initiator user has defined his first contribution and has designated the process members, the server 50 attributes an identifier CID to this first contribution and attributes an identifier AID to each of these aspects, the set being stored in the process database (state memory 62).

The server 50 then sends the contribution and its aspects to the designated users in the form of inquiry messages containing "response choice links", each corresponding to a response choice. For reasons of simplicity, these response choice links will be designated as "response links" in the remainder of the description. Preferably, they comprise standard links, in conformance with international standards and supposedly executable by any type of messaging software in conformance with industry standards (SMTP, POP3, IMAP, HTML, MHTML).

FIG. 3A shows an example of an inquiry message containing the three aspects mentioned above, the initiator user being here named "user1", the message shown as being sent to a user "user2". Depending upon the chosen functional model, each aspect of the contribution is accompanied by four response links "confirm", "disconfirm", "respond", or "propose".

Being the first inquiry message of the process, it is not considered necessary to also insert into this inquiry message links aiming to express an agreement level without expressing an opinion, but such links may be provided to, for example, allow a user to indicate that he does not wish to participate in the process.

Optionally, the server 50 adds an indication in the "subject" field of the message ("Your opinion on: 'Project X Status'"), and also inserts in the message a menu containing a link pointing to the website 53 ("Visualize the discussion online"), a link pointing to a help page ("Help"), as well as various information ("Topic: R&D", "Project X Status, subject sent by User1", etc.).

The user "user2" responds to the server 50 by selecting one of these links, which causes the generation of a response message comprising a return address contained in the link. This address can be fixed and is not necessarily attributed specifically to the started process; it is for example a general address "server@server.com". The user can equally send back several response messages by selecting several links, preferably one link for each aspect of the inquiry message.

An example of a response message is shown in FIG. 3B. It is supposed here that the user "user2" has selected the link "propose" concerning the third aspect of the contribution ("what are the obstacles and the ideas to be further discussed") in the message shown in FIG. 3A.

The body of the message contains various information, notably a code at the bottom of the message, preceded by the mention "Do not erase the following". The message equally contains an invitation to respond ("Place your message here") and an agreement level defined by default as being equal to 100% for a response of the type "propose", but the user can modify it manually.

The code on the bottom of the message is encoded and its structure will be described later. It may already be noted that this code contains the identifiers TYPE and CNATURE of the link that the user has selected, the contribution identifier CID to which the message responds, the aspect identifier AID to which the message responds, and optionally the user identifier UID of the user that received the initial message. The emitter address field of the message contains the address of the user "user2" (user2@user2.com) if the user that responds is actually the user intended by the initial message.

FIG. 3C represents the same message after the user has inserted a contribution into the body of the message. In this example, the user has raised the following point: "A potential financial risk exists for phase Z of the project due to incertitude of change and fluctuations in the prices of the raw materials concerned". The user has equally filled in the "subject" field of the message by indicating the title of his contribution "Financial risk for Z".

The message, once sent, thus forms a new contribution that here comprises only a single aspect ("A potential financial risk exists . . . . ")

When the server 50 receives such a message, it attributes to it a contribution identifier CID (different from the contribution identifier CID to which the message responds) and searches for aspects in the body of the message (search for paragraph jumps), then attributes to each aspect an identifier AID (here only a single aspect found).

The server 50 then stores in its database, for this contribution:

the identifier UID of the user that responded (user2), the identifier CID of the contribution, the identifiers TYPE and CNATURE defining the type and the nature of the contribution, the agreement level mentioned in the contribution, and the aspect contents of the contribution, the respective aspect identifiers AID of the contribution (here a single aspect being stored), and the aspect identifier AID of the previous contribution, the subject of which the present contribution is responding to, which allows for the creation in the database of links between the various contributions and their various aspects (cause and effect link).

Each contribution of this type emitted by each user in response to the first message of the initiator user "user1", and containing one or more aspects, is treated in the same way and is then sent back to each of the other users in the form of an inquiry message. The responses sent back by the users are themselves treated in the same way, the set thus being able to rapidly form a complex tree that is stored and which the users may, if they so desire, consult in the form of various graphical representations by connecting to the website 53.

As an example, FIG. 3D shows an inquiry message sent by the server 50 to the initiator user "user1", this message containing the contribution emitted by the user "user2".

As previously, and in conformance with the functional model used here, the unique aspect of the user's "user2" contribution is accompanied by the four response links "confirm", "disconfirm", "respond", or "propose".

As it is a message containing a contribution responding to a previous contribution, the server 50 has also inserted into the message four links for the expression of an agreement level, that is: "in disagreement", "mostly in disagreement", "mostly in agreement", "in agreement". In conformance with the functional model, these links contain predefined levels of agreement of 0%, 33%, 66%, and 100%, respectively.

FIG. 3E shows the message that the user "user1" sent back to the server on the assumption that the user has selected the link "mostly in agreement" in the message shown in FIG. 3D. The message generated by the link mentions the predefined agreement level and does not propose to the user to insert comments or opinions. At the bottom of the body of the message appears the encrypted code that allows for the identification of the type of message, the context of the inquiry, and optionally the identifier of the recipient of the initial message to which this message responds, here the user identifier UID of the user "user2".

When the server receives such a message, a contribution number is not associated thereto because the message is not considered as a contribution, in conformance with the functional model chosen here. Only the agreement level of the user "user1" to the contribution emitted by the user "user2" is stored, so as to be presented in the graphical representation generated by the website 53.

Configuration Example of Message Generating Links

It follows from the previous examples that each inquiry message sent by the server to a user contains, for each aspect of the contribution included in the message, a set of response links, each including:

the response address (here "server@server.com"),
an identifier of the response choice, and
optionally, the identifier UID of the addressee of the message.

By applying the functional model and the codification model described above, the identifier of the response choice here comprises:
the identifiers TYPE and CNATURE indicating the type and the nature of the choice materialized by the link,
the context identifiers of the contribution, that is the identifiers CID and AID corresponding to the contribution that caused the generation of the message within which the links are inserted,
possibly, the language identifier LG of the contribution.

As each aspect of an inquiry can receive here, by convention, four types of response (CNATURE equal to 0 for a response of the type "confirmation", to 1 for a response of the type "disconfirmation", to 2 for a response of the type "response", and to 3 for a response of the type "proposition") four response links of type 0 (TYPE=0) are associated to each aspect of an inquiry message, that is a link entitled "confirm", a link entitled "disconfirm", a link entitled "respond", and a link entitled "propose".

Additionally, as each user also has here the possibility of responding to the inquiry message with an agreement level by choosing one of the following possibilities: "in disagreement", "mostly in disagreement", "mostly in agreement", "in agreement", four links of agreement level expression, independent of the aspects and entitled "in disagreement", "mostly in disagreement", "mostly in agreement", or "in agreement", are also inserted into an inquiry message, to the exclusion of the first inquiry message.

For an email type messaging system, a conventional response link is of the type "mailto:" and may be configured in a manner such that the identifier of the addressee UID and the identifier of the response choice (TYPE, CNATURE, CID, AID, LG) are found in one of the following parts of the message generated by the link:
in the subject field of the message,
in the body of the message, or
in a header field of the message, invisible to the users.

In the link examples described here, it has been chosen to place the identifier of the message recipient and the identifier of the response choice in the body of the message (command "body"), in the form of a compact code that may optionally be encrypted so that the user cannot corrupt the identifiers UID, TYPE, CNATURE, CID, AID, LG that the code comprises.

Structure Example of Contribution Generation Links

In conformance with the chosen functional model, the label of this link is chosen from "confirm", "disconfirm", "respond", or "propose".

The contents of the links may be the following:

```
MAILTO:server@sever.com?body=Agreement= xxx %0A<-Give
    your mail a subject, it will constitute the title of the
    contribution->%0A<-Place your message here-
    >%0A%0A%0A%0A%0A%0A%0A%0A%0A%0A%0A%0A%0A%0A%0A%0A<-Do
    not erase the following-> %0A-BEGIN-
    UID=xxx;TYPE=0;CNATURE=x;CID=xxx;AID=xxx;LG=FR-END-
```

In this link, "x" are numeric or alphanumeric values, "%0A" is a paragraph jump code. The values "x" are chosen as a function of the link label. For example, the agreement level is equal to 0% if the label of the link is "disconfirm" and is equal to 100% if the label of the link is "confirm". For the links "respond" and "propose", the agreement level is chosen by default to be equal to 100% and may be modified by the user because the agreement level is visible in the body of the message.

The values of the identifiers CID and AID are those of identifiers of the initial contribution that caused the generation of the message containing the link and the aspect to which the link allows a response. The identifier UID is the identifier of the addressee of the message comprising the link (and not the identifier of the user at the origin of the aspect to which the link allows a response, this last being stored in the database). The value x of the identifier CNATURE, comprised between 0 and 3, indicates whether the link label is "confirm", "disconfirm", "respond", or "propose". Finally, the identifier LG specifies the language of the contribution (here, French).

The compact code inserted into the link can be encrypted beforehand, for example by means of an algorithm DES. The link may therefore have the following appearance:

```
MAILTO:server@sever.com?body=Agreement= xxx %0A<-Give
    your email a subject, it will constitute the title of
    the contribution->%0A<-Place your message here-
    >%0A%0A%0A%0A%0A%0A%0A%0A%0A%0A%0A%0A%0A%0A<-Do
    not erase the following->%0A-BEGIN-
    MzdBB6MKITVqO2PvzSmmswvHa9yzhRj5cmByuaVAs69iaFT7ZZJeSz10
    gC2/uc+hAx+12j
    3571M -END-
```

The various identifiers inserted into the message generation links allows to find, without ambiguity, the context in which the response message generated by means of this link is situated, not only within the collaborative process concerned but also within several collaborative processes susceptible of being simultaneously generated by the server. A process identifier may also be provided, but an incremental generation of identifiers CID, in a manner such that each contribution has a unique identifier attributed to it, allows to find, without ambiguity, the contribution in the database of the server and to know to which collaborative process it belongs. Similarly, an incremental generation of aspect identifiers AID done in a manner such that each aspect has a unique identifier attributed to it, allows to know to which process the aspect AID is attached, even to which contribution CID the aspect is attached. In this case, the identifier CID may be deleted and only the identifier AID be inserted into the links.

In a realization variation, the user identifier UID of the addressee of the message may also be deleted. As will be seen later, this identifier allows for the verification that the address of the emitter of the response message generated by the link is actually that of the addressee of the initial message, but this verification does not have to be performed. The identifiers UID, AID, CID may also be replaced by a unique identifier and by a correspondence table in the server database providing these identifier values from the unique identifier value. Thus, the insertion in the links of several identifiers, each having a specific function, simply allows for the simplification of the server database structure by limiting the number of correspondence tables.

Structure Example of Links Merely Aiming for the Expression of an Agreement Level As it has been seen in the message shown in FIG. 3D, it comprises links that are independent of aspects of a contribution and attached to the contribution considered in its entirety. The apparent label of the link is chosen here from "in disagreement", "mostly in disagreement", "mostly in agreement", or "in agreement". The contents of the link may be the following:

link does not include the identifier CNATURE; it is a link for the agreement level expression. Similarly, the identifier AID is deleted from the code because the link is independent of aspects of the initial contribution and is uniquely attached to the contribution considered in its entirety.

The values "x" of the agreement level are chosen as a function of the link label. For example, in conformance with the chosen functional model, the agreement level is equal to 0% if the link label is "in disagreement", equal to 33% if the link label is "mostly in disagreement", equal to 66% if the link label is "mostly in agreement", and equal to 100% if the link label is "in agreement".

As previously, the identifier CID is that of the initial contribution that caused the generation of the message containing the link. Equally, the compact code inserted into the link may be encrypted in order to not be visible.

Message Generation and Treatment Flowchart Examples

Message Generation

Figure 4A:
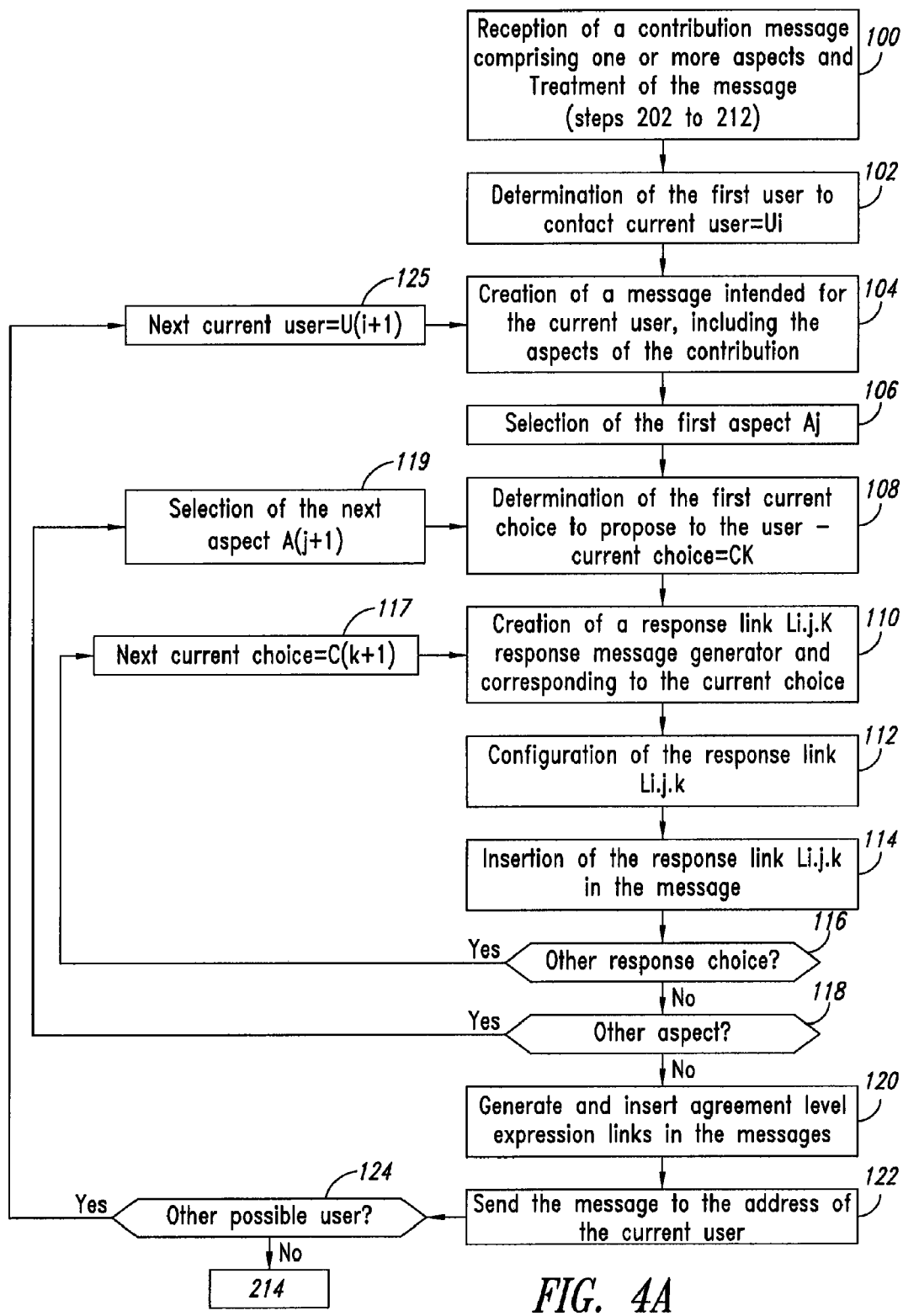
FIG. 4A is a flowchart describing a generation loop of messages comprising response links.

The flowchart in FIG. 4A shows an implementation example of a generation loop of inquiry messages, after the reception of a contribution.

The steps shown in the flowchart imply a cooperation between the Process Manager 51 and the Message Manager 52. The Message Manager 52 ensures the reception of messages and the extraction of their contents (detection of paragraph jumps and the extraction of aspects, extraction of the code at the bottom of the message, and possible decryption of the code if it is encrypted, extraction of the address of the emitter, extraction of the subject field of the message, etc.). The Message Manager transmits the extracted information to the Process Manager 51, which ensures the analysis, attributes the necessary identifiers, and conducts the linked actions, notably the generation of the contents of new messages and the sending of information to the interactive website 53. For the generation of messages, the message contents ("subject" field of the message, body of the message, recipient address, etc.) as well as the contents of links to insert into the messages are defined by the Process Manager. The construction of the messages, that is the insertion of information

```
MAILTO:server@sever.com?body=Agreement= xxx %0A<-Send
    this message
    directly->%0A%0A%0A%0A%0A%0A%0A%0A%0A%0A%0A%0A%0A<-Do
    not erase the following-> %0A-BEGIN-
    UID=xxx;TYPE=1;CID=xxx;LG=FR-END-
```

As previously, "x" are numeric values, "%0A" is a paragraph jump code. Here, the compact code inserted into the into the different parts of the messages, the formation and the insertion of links, the addressee's address, the encryption of data, is ensured by the Message Manager, as well as the sending of messages. It will be noted that the Message Manager is considered here as a unique element, for reasons of simplicity. In practice, the implementation of the Message Manager may require the provision of two elements, one for generating and sending messages, the other for receiving and analyzing messages, these two operations corresponding to different processes.

The generation of messages is initiated upon the reception of a contribution message comprising one or more aspects (step 100). The reception of this message first starts steps of analysis and of treatment (202 to 212) that will be described later in relation with FIG. 5. It will be assumed here that these analysis and treatment steps have been performed and that the Process Manager has at its disposition the contribution identifier (CID), the aspect identifiers (AID) of the contribution, and possibly the language identifier (LG) of the contribution.

The Process Manager thus determines the first user Ui to contact in the list of process member users (step 102). In a general manner, and with the occasional exception provided for in certain types of process, all the process member users are to be contacted. Each user is designated by his identifier UID to which a messaging address is associated.

The Process Manager then asks the Message Manager to create a message intended for the current user Ui (step 104), this message comprising all the aspects of the received contribution. The Process Manager then selects the first aspect Aj of the contribution (step 106) and determines the first current choice Ck to propose to the user for this aspect (step 108). As the functional model chosen here as an example provides four types of choice per aspect of a contribution ("confirm", "disconfirm", "respond", or "propose") the Process Manager chooses the first choice ("confirm") and requests that the Message Manager create a corresponding response link Li,j,k (step 110). Then the Message Manager configures the link (step 112) by determining its contents and by communicating it to the Message Manager, this latter then inserting it in the message (step 114). The Process Manager then determines if another response choice is possible (step 116) and, if so, returns to step 110 by a step 117 where it selects the next current choice C(k+1) (for example "disconfirm").

The Process Manager and the Message Manager execute this link generation loop until all the response choices provided by the process functional model have been depleted. The Process Manager then determines whether the received contribution comprises another aspect (step 118) and, if so, selects the next aspect A(j+1) (step 119) and returns to step 108 to execute once again the link generation loop.

When all the response links relative to all the aspects of the contribution have been generated and inserted into the message, the Process Manager asks the Message Manager to generate agreement level expression links, here four links "in disagreement", "mostly in disagreement", "mostly in agreement", or "in agreement", and to insert them into the message (step 120). The Message Manager then sends the message to the current user (step 122).

The Process Manager then determines whether another user exists in the list of process members (step 124) and, if so, selects the next current user U(i+1) and returns to step 104 to generate a message to the attention of this user as well as all the associated response links. The message generation loop finishes once messages have been sent to all the users. The Process Manager then goes to a step 214 shown in FIG. 5, where it waits for a new response message or an event requiring the generation of messages (for example an initialization request of a new process emitted by the website 53).

It will be noted that an almost-identical flowchart may be provided for the generation of the first inquiry message after initialization of the process by the initiator user. In this case, step 100 is not the reception of a message but the reception of a process creation request, sent by the website (Cf. FIG. 2) or received in the form of a message. The step 120 may be deleted or skipped if it is not desired to the insert agreement level expression links in the first inquiry message of the process.

Figure 4B:
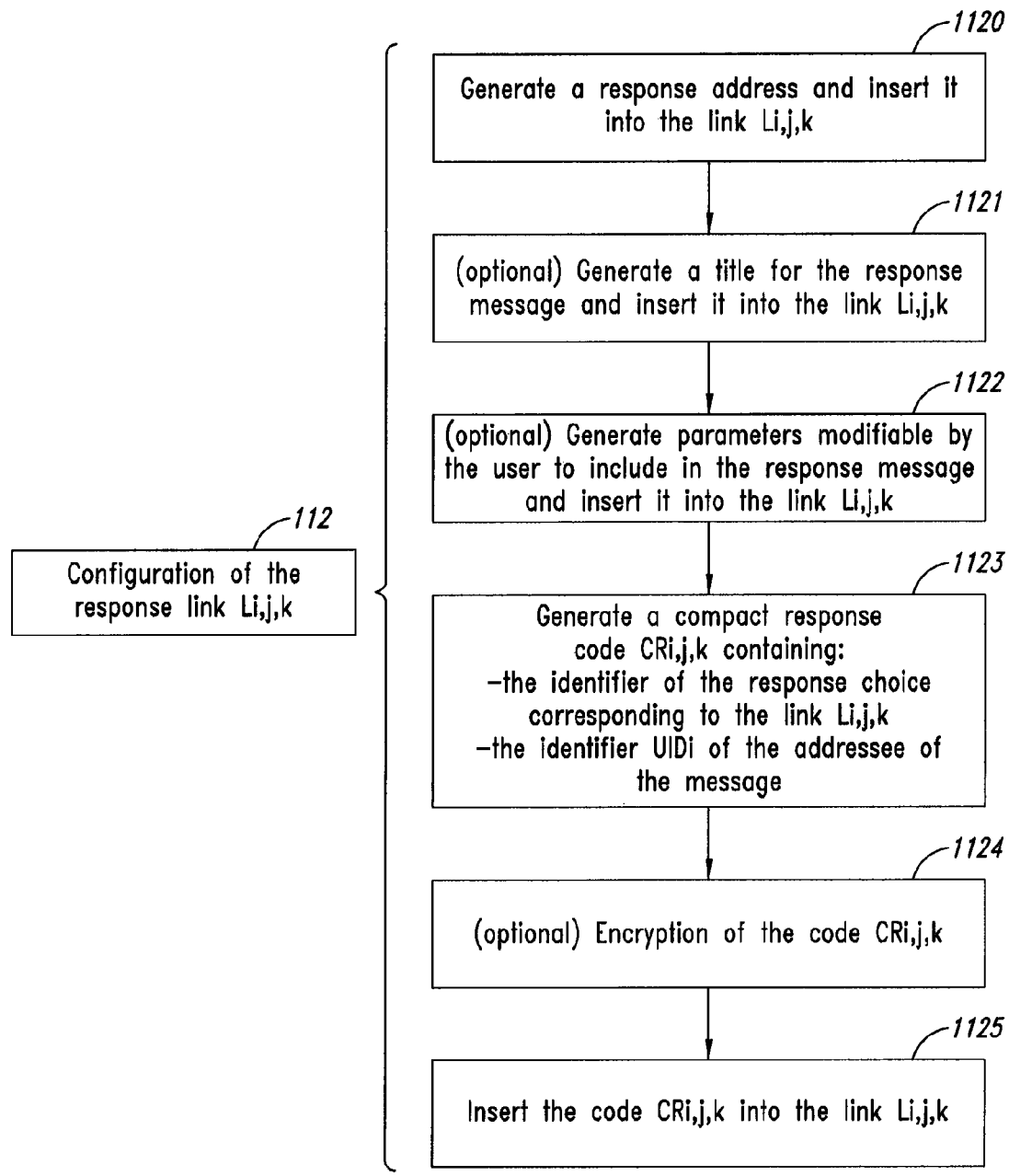
FIG. 4B is a flowchart describing a configuration loop of response links.

The flowchart shown in FIG. 4B shows sub-steps of step 112 for the configuration of a response link Li,j,k. For a better understanding of these steps, the following link will be considered as an example:

```
MAILTO:server@sever.com?body=Agreement= xxx %0A<-Give
   your email a subject, it will constitute the title of
   the contribution->%0A<-Place your message here-
   >%0A%0A%0A%0A%0A%0A%0A%0A%0A%0A%0A%0A%0A%0A%0A<-Do
   not erase the following->%0A-BEGIN-
   UID=xxx;TYPE=0;CNATURE=x; CID=xxx;AID=xxx;LG=FR-END-
```

The Process Manager first determines the response address that should appear in the message generated by the link (here "server@server.com") and requests the Message Manager to insert the link (step 1120). Optionally, the Process Manager may generate a title (subject of the message) and supply it to the Message Manager so that the Message Manager inserts it into the link (step 1121) by placing in front of it the command "subject" (this step is not implemented to generate the link above, which does not comprise the command "subject" and only comprises the command "body").

The Process Manager then generates the user-modifiable parameters (i.e., the visible parameters) and the Message Manager inserts them in the link (step 1123). This optional step allows for the insertion in the response message of an agreement value as well as certain mentions that may help the user. In the link example above, it includes the following mentions, separated by paragraph jumps (command "%0A"):

```
Agreement= xxx
   <-Give your email a subject, it will constitute the title
      of the contribution->
   <-Place your message here->
   <-Do not erase the following->
```

The Process Manager then generates a compact response code CRi,j,k (step 1123) comprising an identifier of the response choice and the identifier UID of the addressee of the message. The response choice identifier here comprises the identifiers TYPE and CNATURE, the identifiers CID and AID of the contribution context, and possibly the language identifier LG of the contribution, as well as the identifier UID of the addressee of the message, that is here the following code:

UID=xxx;TYPE=0;CNATURE=x;CID=xxx;AID=xxx;LG=FR

Once the code has been generated, the Process Manager supplies it to the Message Manager that may optionally encrypt it (step 1124) before inserting it into the link Li,j,k (step 1125).

Treatment of Received Messages

Figure 5:
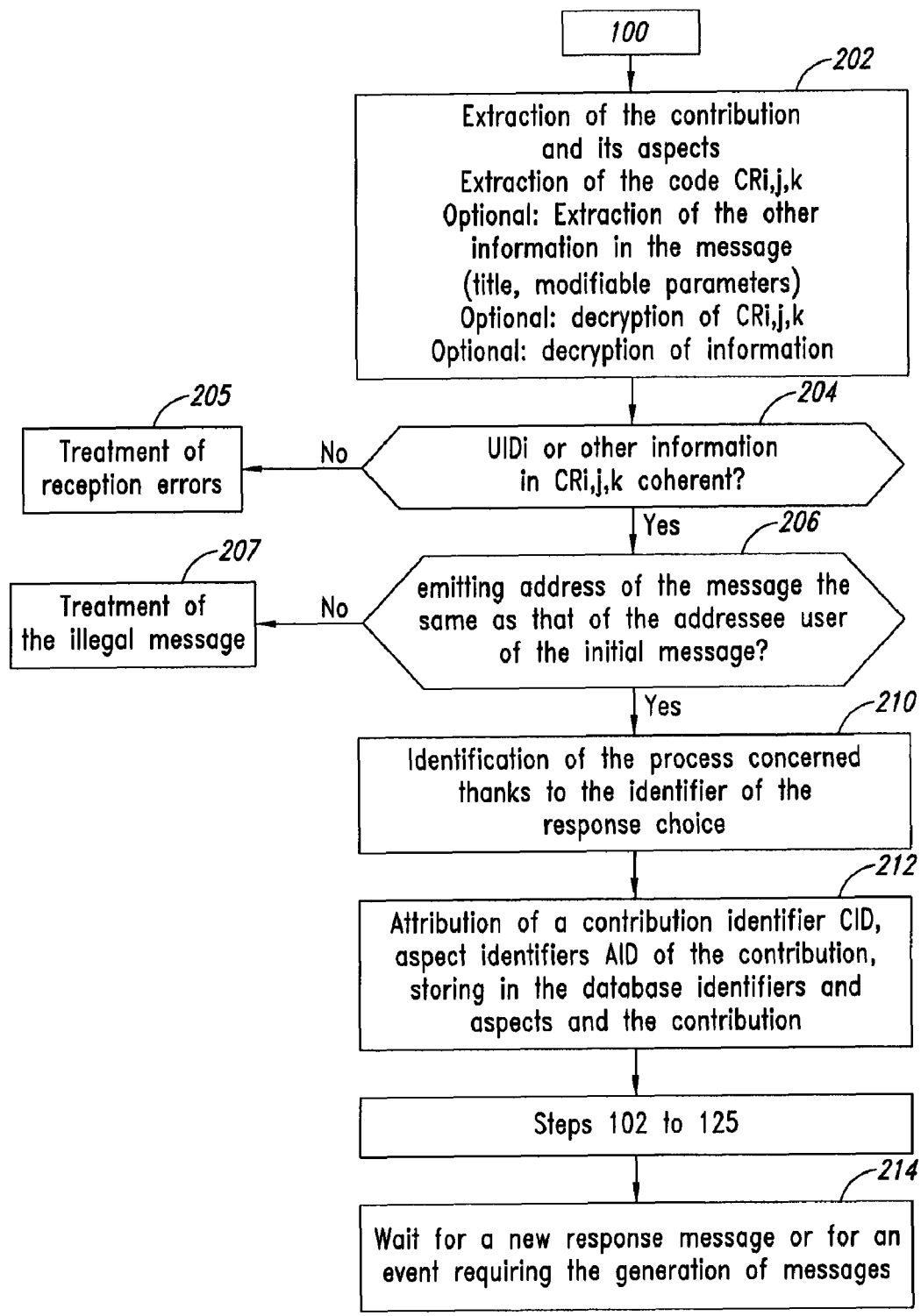
FIG. 5 is a flowchart describing steps of message reception.

The flowchart shown in FIG. 5 shows treatment steps of a contribution message received at step 100 (FIG. 4A), these steps notably allowing for the extraction of contribution aspects and the attribution of identifiers to them.

During a step 202, the Message Manager extracts the useful elements of the message, that is the contribution and its aspects, the code CRi,j,k, and, if need be, other useful information such as the title of the message and the agreement level (modifiable parameters). The Message Manager decrypts the code CRi,j,k if this is encrypted, then supplies these various elements to the Process Manager. If other information is encrypted, the Message Manager also decrypts them.

During a step 204, the Process Manager verifies that the received information are coherent, notably the identifier UIDi (identifier of the user that was the addressee of the initial message to which the present message is responding), the identifiers CID, AID, TYPE, CNATURE, LG. These identifiers are not coherent if they are not readable or if the identifiers UIDi, CID, AID do not correspond to values present in the process database. In the case of incoherencies, the Process Manager goes to a step 205 provided for the treatment reception errors. This step may for example comprise the sending back of the inquiry to the initial addressee (if the identifier UIDi is coherent) or the sending to this latter a message asking him to respond again to the inquiry message.

If the identifiers are coherent, the Process Manager verifies during a step 206 that the emitter address of the contribution message corresponds with the identifier UIDi present in the code CRi,j,k. If they do not correspond, the Process Manager goes to a step 207 of "illegal" message treatment to make a decision. The decision to be made in such a case depends notably on the management mode of the collaborative process and on commercial decisions, and may comprise:

i) not taking the message into consideration, ii) automatically integrating the new user into the collaborative process and informing the other users of the presence of this new user, iii) sending the message to the original addressee and indicating to him that he himself did not respond to the inquiry message and that the response cannot be accepted, iv) sending a message to the initiator user of the process to indicate to him that a new user has entered into the collaborative process, v) starting an admission or rejection process of the new user, etc.

Several decisions can be concomitant if they are not contradictory. Thus, the decisions ii), iii) and iv) could be simultaneously implemented. The process of admission v) may comprise the sending of an information message to the initiator user of the process, such a message comprising response links for the acceptance or the rejection of the new user.

If the emitting address of the message is that of the addressee of the initial message, or if the new user is admitted into the process (in this case an identifier UID' is attributed to the new user and this identifier replaces the identifier UID present in the received code for the rest of the treatment), an identifier CID is attributed to the contribution received and identifiers AID are attributed to aspects of the contribution. As indicated above, the Process Manager then saves the identifier CID in its database, as well as the identifier UID (or UID') of the user that responded, the identifiers TYPE and CNATURE that define the type and the nature of his contribution, the agreement level mentioned in the contribution (if necessary) and the contents of the aspects of the contribution as well as their respective identifiers AID.

The Process Manager then executes the steps 102 to 125 previously described (FIG. 4A) to transmit the contribution to the other users in the form of inquiry messages, then goes to the step 214 where it waits for a new response message or for an event requiring the generation of messages (for example a new process initialization request sent by the website 53).

Implementation Variations of the Method According to an Embodiment and Application Domains It will clearly appear to the skilled person that the method according to an embodiment is susceptible of various other implementations. Notably, even though in the preceding has been described a compact code comprising both the identifier UID and the identifier of the response choice (here TYPE; CNATURE;CID;AID;LG), these elements may be arranged differently. For example, the identifier UID may be placed in the response links after the command "subject" in order to then be located in the "subject" field of the message generated by the links, whereas the identifier of the response choice would be left in the body of the message. As indicated above, all or some of these identifiers may equally be placed in the response links so as to be located, in the messages generated by these links, in a header field that is invisible to the user.

Equally, the insertion of the identifier UID in the links facilitates the realization of the control step 206 in FIG. 5 but links not having the identifier UID could also be provided in the framework of a begun collaborative process, for example where it is not desired to implement the step 207.

FIG. 6 shows a variation of the message shown in FIG. 3B wherein the identifier UID is placed in an encrypted form in the "subject" field of the message, whereas the identifier of the response choice is placed, also in an encrypted form, in the body of the message.

Additionally, the method according to an embodiment can be implemented with any messaging system that provides message generating links allowing for the configuration of the contents of the generated messages. All email messaging software in conformance with the industry standards (SMTP, POP3, IMAP, HTML, MHTML) can be used to contribute to a collaborative process. The method according to an embodiment is also applicable to instant messaging systems and to mobile telephone messaging systems SMS, etc., for example:

for emails, the standards RFC822, RFC2646, RFC2368, RFC2110-2111, RFC2854, RFC2045-2047, RFC 1738, for instant messaging, the standards RFC4470, RFC3921, RFC2779, Jabber, Irc, Icq, Msn, Aim, Yahoo, for mobile telephone messaging, the standards CDMA, EDGE, GPRS, GSM, UMTS, I-MODE/C-HTML, MMS, SMS, WAP/WML.

The links used by the method of an embodiment are thus compatible with the main messaging devices on the market (Microsoft Outlook, Lotus Notes, Mozilla, Thunderbird, Apple Mail, RIM, Blackberry, Evolution, Kmail, Yahoo! mail, Gmail, Hotmail, portable telephones GSM, etc.).

The method according to an embodiment can also be used within any other messaging system that allows for the insertion of response messages links, which allow for the creation of new messages of which the addressee and a part of the contents are predefined in the response link.

If the user messaging system allows, generating a contribution can be done when no connection is available between the user's apparatus (computer, telephone, personal data assistant PDA . . . ) and the computing system that manages the collaborative process. In such a case, the contribution is generated "offline" and is saved by the user's messaging software until the connection is re-established and allows it to be sent to the computing system.

The method according to an embodiment is also susceptible of diverse applications. The conceptual model, the functional model, the process codification model, and the structure of the response links can be adapted to the targeted application. In the following will be described an application example of a collaborative process aiming to set the date of a meeting.

The method according to an embodiment can include the management of attachments and the insertion in the messages of links pointing to an attachment supplied by a user, as will be seen in the example described below.

Further Application Example

Setting of a Meeting Date

The FIGS. 7A to 7E show a collaborative process aiming to set the date of a meeting, the collaborative process server 50 being configured to manage this type of process.

Figure 7A:
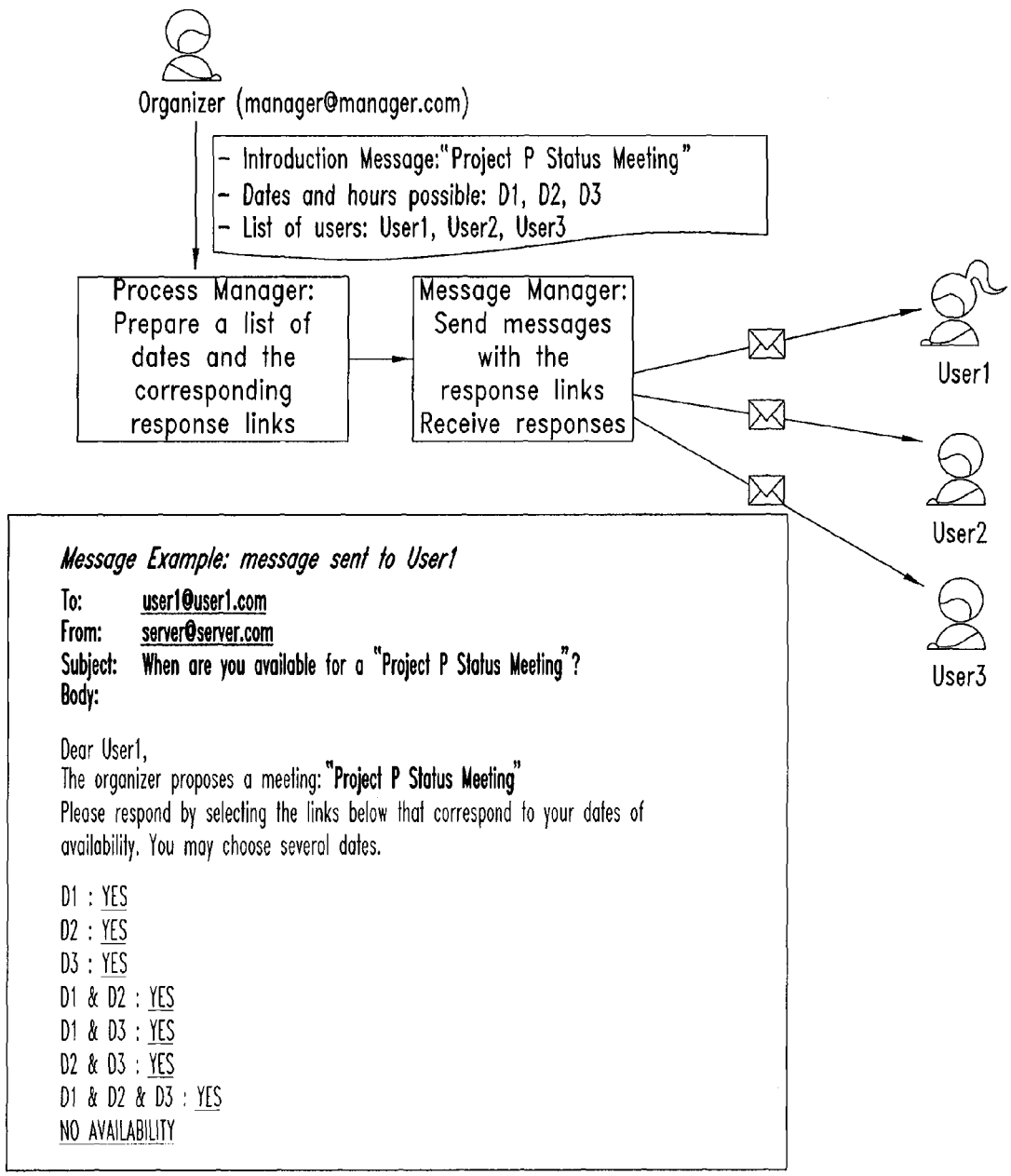
FIGS. 7A to 7E show another implementation example of the method to manage a collaborative process concerning the choice of a meeting date, according to an embodiment.

In FIG. 7A, a meeting organizer (manager@manager.com) connects to the server 50 via the website 53 to initiate the process. The organizer supplies the following initial contribution to the server:
Introduction message "Project P Status Meeting"
Dates and hours possible D1, D2, D3
Users selected: User1, User2, User3

The Process Manager thus prepares a list of dates comprising the dates D1, D2, D3 and defines the contents of the corresponding response links. It sends to the Message Manager the contents of a message destined for the selected users, as well as the contents of the response links. The Message Manager sends the message to the designated users, by inserting therein the response links.

Message example (message sent to User1):

---

To: user1@user1.com
From: server@server.com
Subject: When are you available for a "Project P Status Meeting"?
Body:
Dear User1,
The Organizer proposes a meeting: "Project P Status Meeting"
Please respond by selecting the links below that correspond to your dates of availability. You may choose several dates.
D1 : YES
D2 : YES
D3 : YES
D1 & D2 : YES
D1 & D3 : YES
D2 & D3 : YES
D1 & D2 & D3 : YES
NO AVAILABILITY

---

Figure 7B:
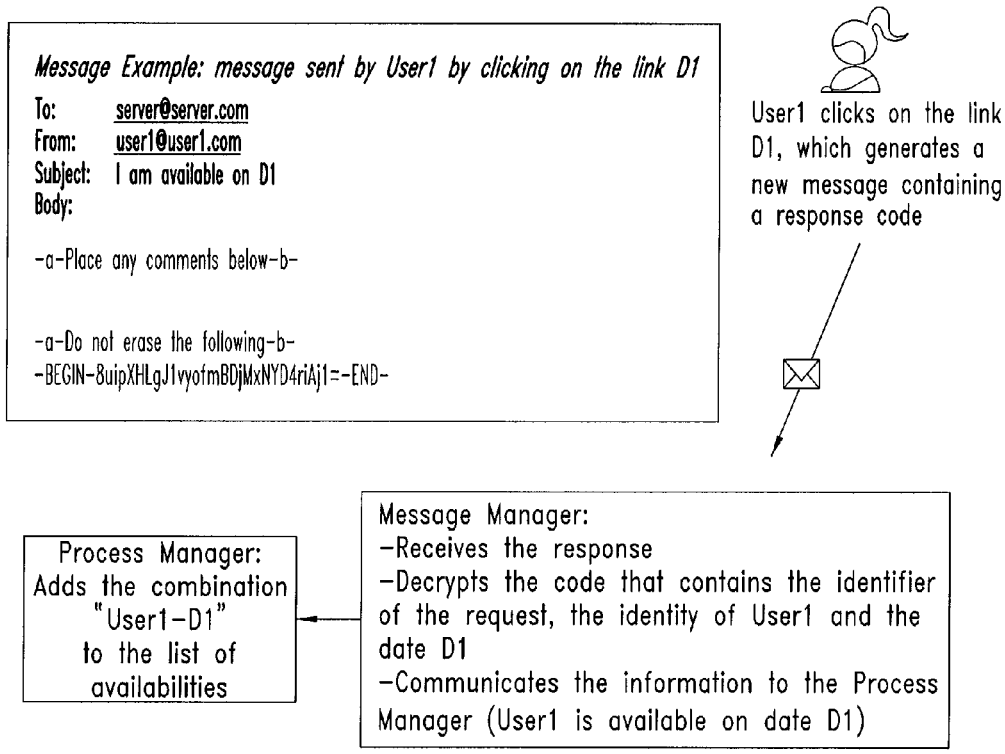

In FIG. 7B, the user "User1" has received the message and has selected the link D1 (that is to say, has clicked on the link "YES" next to the date D1). This link generates a response message containing a response code, for example the following message:

---

To: server@server.com
From: user1@user1.com
Subject: I am available on D1
Body:
-a-Place any comments below-b-
-a-Do not erase the following-b-
-BEGIN-8uipXHLgJ1vyofmBDjMxNYD4riAj1=-END-

---

The response message is sent to the server 50. The Message Manager receives it and decrypts the code present at the bottom of the email, which contains the identifier of the inquiry, the identity of User1, and the date D1. It communicates this information to the Process Manager, which signifies that "User1 is available for date D1". The Process Manager thus adds the combination "User1-D1" to the list of availabilities.

Figure 7C:
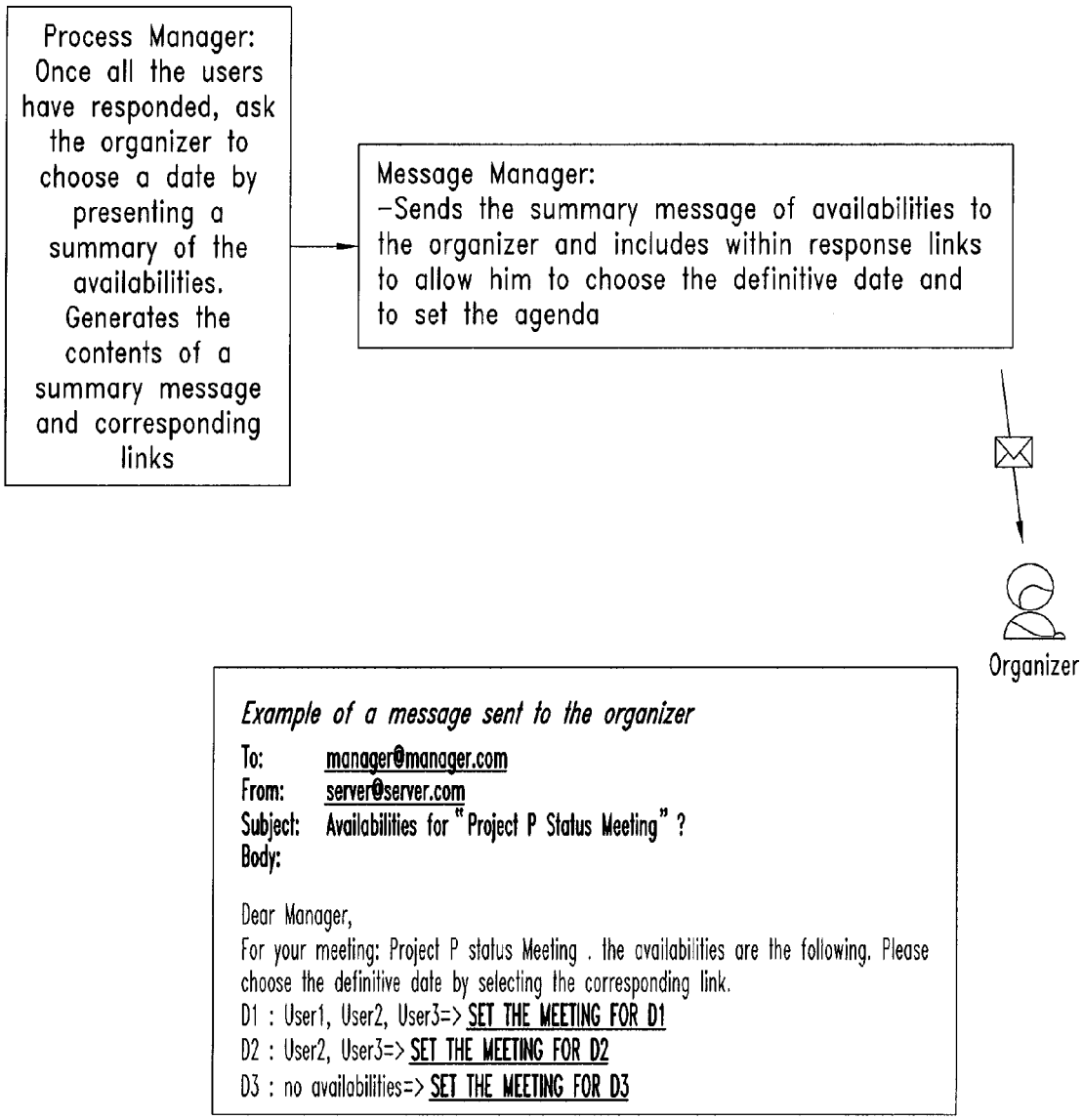

In FIG. 7C, it is supposed that all the users have responded. The Process Manager thus requests that the organizer of the meeting choose a date by presenting to him the summary of the availabilities. To this end, it generates the contents of a summary message as well as the contents of response links corresponding to the received availabilities. The Message Manager generates the message and sends it to the meeting organizer by including therein the links that allow the organizer to choose the definitive date of the meeting and to define the agenda.

Example of a message sent to the organizer:

---

To: manager@manager.com
From: server@server.com
Subject: Availabilities for "Project P Status Meeting"?
Body:
Dear Manager,
For your meeting: "Project P Status Meeting", the availabilities are the following, please choose a definitive date by selecting the corresponding link.
D1 : User1, User2, User3 => SET THE MEETING FOR D1
D2 : User2, User3 => SET THE MEETING FOR D2
D3 : no availabilities => SET THE MEETING FOR D3

---

Figure 7D:
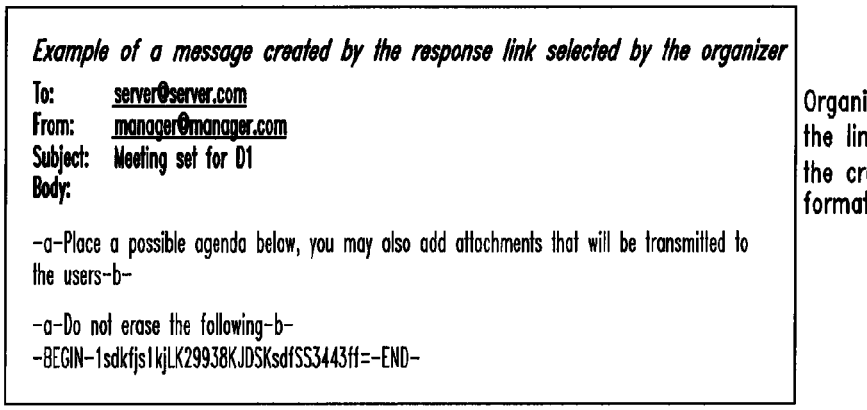
Figure 7D:
Figure 7D:
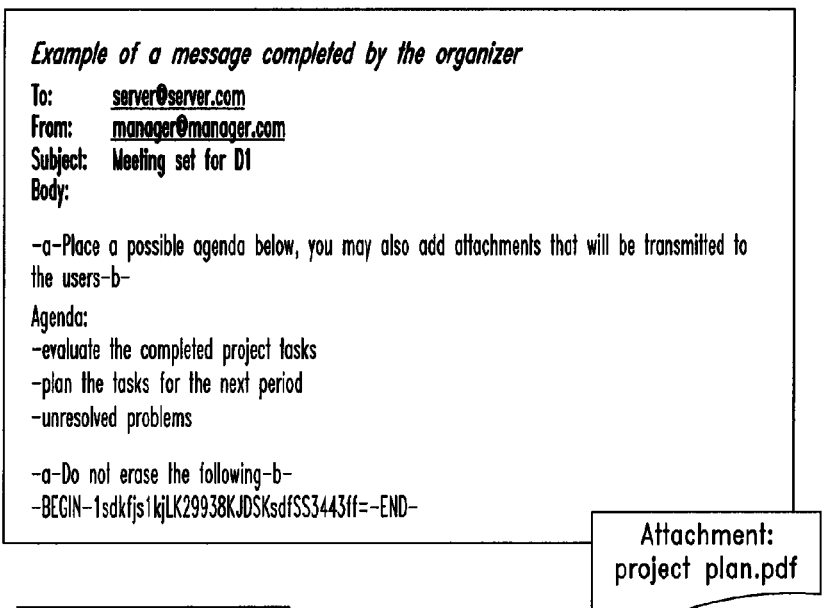

In FIG. 7D, the organizer has clicked on the link D1, thus causing the creation of a pre-configured message, for example the following message:

---

To: server@server.com
From: manager@manager.com
Subject: Meeting set for D1
Body:
-a-Place a possible agenda below, you may also add attachments that will be transmitted to the users-b-
-a-Do not erase the following-b-
-BEGIN-lsdkfjslkjLK29938KJDSKsdfSS3443ff=-END-

---

The organizer completes the message, for example in the manner indicated below, and additionally inserts therein an attachment "project plan.pdf":

---

To: server@server.com
From: manager@manager.com
Subject: Meeting set for D1
Body:
-a-Place a possible agenda below, you may also add attachments that
    will be transmitted to the users-b-
Agenda:
- evaluate the completed project tasks
- plan the tasks for the next period
- unresolved problems
-a-Do not erase the following-b-
-BEGIN-lsdkfjslkjLK29938KJDSKsdfSS3443ff=-END-
+ attachment: project plan.pdf

---

The organizer sends this response message to the server. The Message Manager decrypts the code that contains the identifier of the inquiry, the identity of the organizer, and the date D1 and supplies it to the Process Manager. It also extracts the attachment and stores it in a Document Portal. Finally, it informs the Process Manager that the meeting will be held on D1, with the specified agenda.

On its side, the Process Manager sets the date of the meeting for D1, with the specified agenda and the associated attachment. It requests that the Message Manager send a notification message to the users comprising a link pointing to the attachment.

Figure 7E:
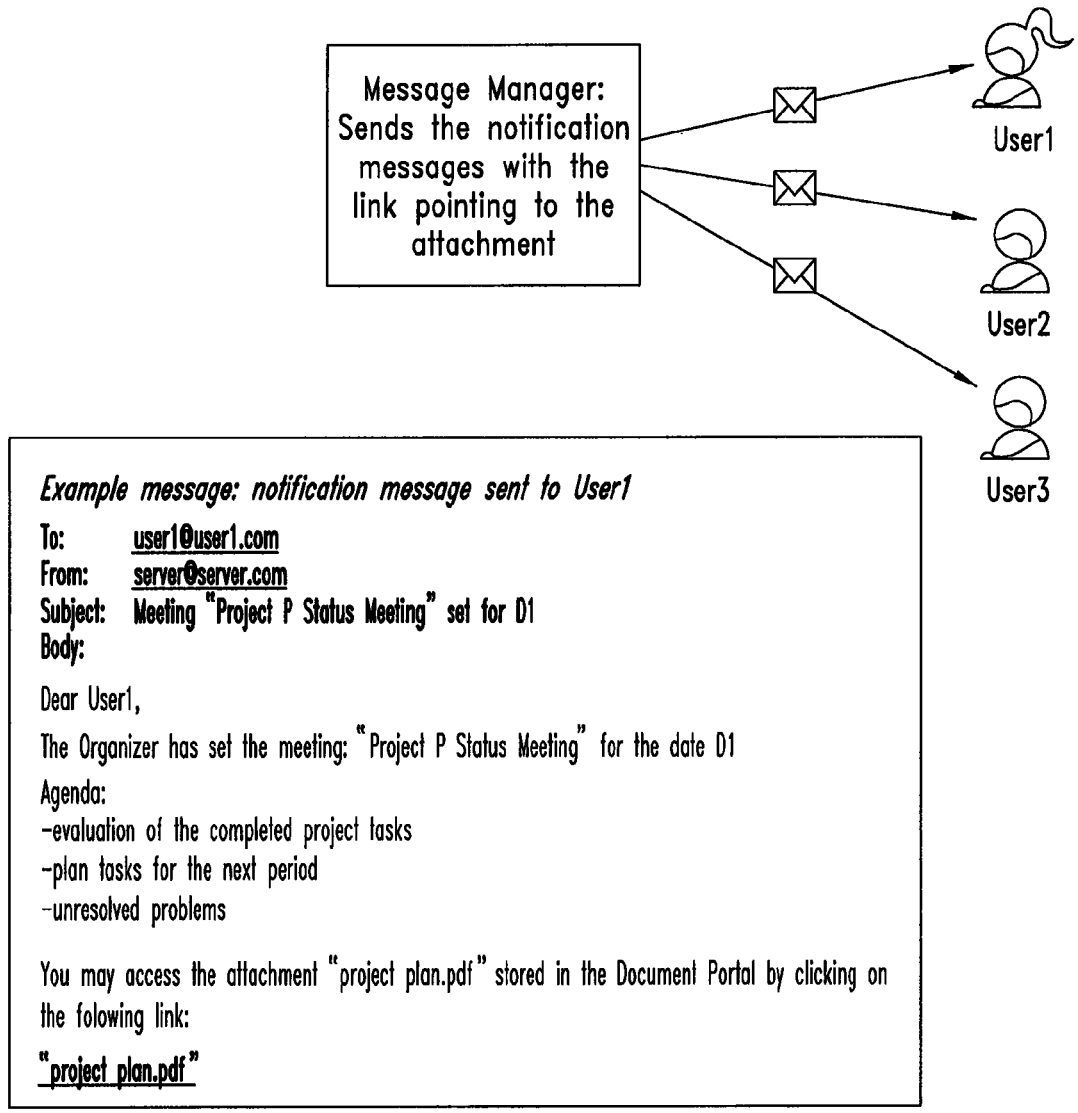

Thus, in FIG. 7E, the Message Manager sends to the users a notification message comprising the link pointing to the attachment. This message is for example configured as follows:

---

To: user1@user1.com
From: server@server.com
Subject: Meeting "Project P Status Meeting" set for D1
Body:
Dear User1,
The Organizer has set the meeting: "Project P Status Meeting" for
    the date D1
Agenda:
- evaluate the completed project tasks
- plan the tasks for the next period
- unresolved problem
You may access the attachment "project plan.pdf" stored in the
    Document Portal by clicking on the following link:
"project plan.pdf" in the Document Portal

---

In the light of the described examples, it is within the purview of the skilled person to define other conceptual, functional, and codification models of a collaborative process, according to the nature of the process and the application that it covers, as well as define various response link structures, all while remaining within the framework of the disclosure.

The foregoing detailed description has set forth various embodiments of the devices and/or processes via the use of block diagrams and examples. Insofar as such block diagrams and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via. Application Specific Integrated Circuits (ASICs). In one embodiment, the present subject matter may be implemented via one or more digital signal processors executing, for example, instructions stored on one or more memories. However, those skilled in the art will recognize that the embodiments disclosed herein, in whole or in part, can be equivalently implemented in standard integrated circuits, as one or more computer programs executed by one or more computers (e.g., as one or more programs running on one or more computer systems), as one or more programs executed by on one or more controllers (e.g., microcontrollers) as one or more programs executed by one or more processors (e.g., microprocessors), as firmware, using discrete circuitry, or as virtually any combination thereof, and that designing the circuitry and/or writing the code for the software and or firmware would be well within the skill of one of ordinary skill in the art in light of the teachings of this disclosure.

When logic is implemented as software and stored in memory, logic or information can be stored on any computer-readable medium for use by or in connection with any processor-related system or method. In the context of this disclosure, a memory is a computer-readable medium that is an electronic, magnetic, optical, or other physical device or means that contains or stores a computer and/or processor program. Logic and/or the information can be embodied in any computer-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "computer-readable medium" can be any element that can store the program associated with logic and/or information for use by or in connection with the instruction execution system, apparatus, and/or device. The computer-readable medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), digital tape. Note that the computer-readable medium could be any suitable medium upon which the program associated with logic and/or information can be electronically captured, via for instance optical scanning, then compiled, interpreted or otherwise processed in a suitable manner if necessary, and then stored in memory.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
managing a collaborative process using a computing system, the collaborative processing including sending electronic messages to user members of the collaborative process and receiving response messages emitted by the users, by:
receiving a first message from a first user;
generating a second message;
inserting in the second message information taken from the first message;
inserting in the second message, in relation with all or some of the information taken from the first message, at least one selection link of a response choice to the first message;
inserting in the link a response address and at least a first identifier to identify a response choice corresponding to the link and to the information taken, and including, in the first identifier, an identifier provided to identify a state of the collaborative process within which the generation of the second message is written; and
sending the second message to at least one second user, the link being configured to directly generate a response message containing the first identifier when it is selected by a user that has received the second message.

2. The method according to claim 1, comprising a step of inserting into the link a second identifier provided to identify the at least one second user as an addressee of the second message, the link being configured to directly generate a response message containing the first and the second identifiers when it is selected by the second user.

3. The method according to claim 2, comprising a step of configuring the link such that the first and the second identifiers are placed in one of the following parts of the response message that can be generated by the link: a subject field of the message; a body of the message; and a header field of the message.

4. The method according to claim 2, comprising a step of encrypting at least the second identifier before inserting it in the link.

5. The method according to claim 1, comprising including, in the first identifier, an identifier provided to characterize a type or a nature of the response choice corresponding to the link.

6. The method according to claim 1, comprising inserting into the link an indicator of a level of agreement or of approval relative to the information taken from the first message.

7. The method according to claim 1, comprising inserting into the link a language identifier of the collaborative process in which the generation of the second message is written.

8. The method according to claim 1, comprising storing, in a correspondence table, a relation between the first identifier and a state of the collaborative process in a context of which the second message is generated.

9. The method according to claim 1, comprising storing in a correspondence table a relation between the first identifier and an identity of an addressee of the second message.

10. The method according to claim 1, comprising:
receiving a response message generated by the link;
extracting the first identifier of the response message;
extracting from the response message new information written by a user that sent the response message; and
attributing to the new extracted information one or more identifiers and storing the new information and the one or more identifiers associated with the information.

11. The method according to claim 1, comprising:
receiving a response message generated by the link;
extracting from the response message new information written by a user that sent the response message;
searching for a separator symbol within the new information;
dividing the new information into several aspects based on the separator symbol;
attributing an identifier to each aspect; and
storing the aspects as well as the identifier associated with each aspect.

12. The method according to claim 11, comprising:
generating a third message;
inserting into the third message the aspects of the new information taken from the response message;
inserting into the third message, for each aspect of the new information, at least one selection link of a response choice to the third message;
inserting into each link a response address and at least the identifier of the aspect corresponding to the link; and
sending the third message to at least a user of the collaborative process.

13. The method according to claim 11, comprising:
extracting a second identifier from the response message;
identifying an addressee of the initial message based on the second identifier; and
verifying that there is a concordance between an emitting address of the response message and the addressee of the initial message, and, if not, beginning an action leading to acceptance or rejection of the emitting address of the response message as a member of the collaborative process.

14. The method according to claim 1 wherein the collaborative process is a conversation or a vote, comprising inserting, in messages sent to users, several generating links of response messages allowing the users to express points of view or responses to questions.

15. The method according to claim 14, comprising:
inserting into messages sent to users links allowing the users to express a level of agreement to points of view expressed by other users without themselves expressing a point of view; and
inserting into each link a parameter representative of a level of agreement.

16. The method according to claim 1, comprising:
receiving the first message by means of a messaging software;
generating the link so that the messaging software directly generates a response message containing the first identifier; and
sending the message.

17. A computing system, comprising:
at least one processor; and
at least one memory, wherein the at least one processor and the at least one memory are configured to implement a message manager configured to manage a collaborative process by:
receiving a first message from a first user of the collaborative process;
generating a second message;
inserting in the second message information taken from the first message;
inserting in the second message, in relation with all or some of the information taken from the first message, at least one selection link of a response choice to the first message;

inserting in the link a response address and at least a first identifier to identify a response choice corresponding to the link and to the information taken, and including, in the first identifier, an identifier provided to identify a state of the collaborative process within which the generation of the second message is written; and sending the second message to at least one second user of the collaborative process, the link being configured to directly generate a response message containing the first identifier when it is selected by a user that has received the second message.

18. The computing system according to claim 17 wherein the message manager is further configured to:

receive an electronic message containing an attachment;

save the attachment; and send to member users of the collaborative process a message containing a link pointing to the saved attachment.

19. The computing system according to claim 17 wherein the message manager is configured to insert, into messages, message generation links compatible with an electronic messaging infrastructure based upon at least one of electronic messaging, instant messaging, or mobile telephone messaging standards.

* * * * *